United States Patent [19]

Wiesner et al.

[11] Patent Number: 5,058,963
[45] Date of Patent: Oct. 22, 1991

[54] BELT-TYPE CATERPILLAR FOR TRACK-LAYING VEHICLES AND SNOWMOBILES

[75] Inventors: Hagen H. Wiesner, Solingen; Klaus Spies, Remscheid; Ekkehard Oertgen, Radevormwald, all of Fed. Rep. of Germany

[73] Assignee: Diehl GmbH & Co., Nuremberg, Fed. Rep. of Germany

[21] Appl. No.: 549,750

[22] Filed: Jul. 9, 1990

[30] Foreign Application Priority Data

Jul. 27, 1989 [DE] Fed. Rep. of Germany ....... 3924893

[51] Int. Cl.[5] ............................................. B62D 55/24
[52] U.S. Cl. .................................. 305/35 EB; 305/38; 305/58 R
[58] Field of Search .................. 305/35 R, 35 EB, 38, 305/39, 58 R, 58 PC

[56] References Cited

U.S. PATENT DOCUMENTS

| 1,949,423 | 3/1934 | Knox et al. | 305/38 |
| 1,966,450 | 7/1934 | Knox et al. | 305/38 |
| 4,842,346 | 6/1989 | Schlegl | 305/35 EB X |

FOREIGN PATENT DOCUMENTS

| 494279 | 3/1930 | Fed. Rep. of Germany | 305/38 |
| 2706891 | 8/1977 | Fed. Rep. of Germany | . |
| 2621237 | 11/1977 | Fed. Rep. of Germany | . |
| 3731618 | 4/1988 | Fed. Rep. of Germany | . |
| 1145925 | 11/1957 | France | . |
| 1146925 | 11/1957 | France | . |

Primary Examiner—Russell D. Stormer
Attorney, Agent, or Firm—Scully, Scott, Murphy & Presser

[57] ABSTRACT

A belt-type Caterpillar for track-laying vehicles and snowmobiles, incorporating individual replaceable belt segments, in which each belt segment incorporates a base member consisting of rubber including tensile-loaded inserts which encompass a traction or tie anchor transversely supported within the rubber in the region of the connecting locations for the belt segments. The connecting locations which are formed as hinge members vulcanized into the belt segments include tubular sections with inserted tubes or track pins, as well as arms arranged at a lateral spacing from each other, whereby the arms retain the tie anchor which is formed as a connecting pin or bolt. The inserts consist of at least two endless fabric bands or webs arranged at a spacing adjacent each other, the arms terminating proximate a nonelastic bending region of a rubber or track dog, or transversely stiff traverse, and in which the hinge members possess laterally arranged arms.

7 Claims, 3 Drawing Sheets

BELT-TYPE CATERPILLAR FOR TRACK-LAYING VEHICLES AND SNOWMOBILES

BACKGROUND OF THE INVENTION

1. Field of the Invention

The present invention relates to a belt-type Caterpillar for track-laying vehicles and snowmobiles, incorporating individual replaceable belt segments, in which each belt segment comprises a base member consisting of rubber including tensile-loaded inserts which encompass a traction or tie anchor transversely supported within the rubber in the region of the connecting locations for the belt segments. The connecting locations which are formed as hinge members vulcanized into the belt segments include tubular sections with inserted tubes or track pins, as well as arms arranged at a lateral spacing from each other, whereby the arms retain the tie anchor which is formed as a connecting pin or bolt.

2. Discussion of the Prior Art

In the disclosure of German Laid-Open Patent Application 27 06 891, a Caterpillar track consists of a plurality of interconnectable flexibly constructed Caterpillar chain units. Integrated into a rubber member, in the direction of travel, are a number of cord lines, in conjunction with transversely arranged tie anchors. In addition, an encompassing wire cable is disposed within the rubber. The rubber member also possesses gripping ribs or ridges and replaceably arranged drive bars with guide elbows as well as rigid; in essence, non-articulated connecting elements for the coupling of neighboring Caterpillar track units. An advantage of that type of track structure resides in that damaged components can be rapidly exchanged. However, in that type of design, disadvantageous is the relatively heavy weight of a track unit and the rigid interconnection of the caterpillar track units. Due to the lack of flexibility, the rigid interconnection results in an increased amount of wear of the running dog or faces.

A flexible or bendable track belt for selfpropelled working machines is known from the disclosure of German Laid-Open Patent Application 37 31 618. Herein, the track belt comprises a bendable resilient material, such as rubber, and has a dual metal reinforcement, of which one extends longitudinally and one extends transversely. The connection between the ends of the belt is articulatedly provided in the form of a double-hinged structure. A disadvantage encountered with that type of arrangement is that any partial damage to the track belt can only be eliminated by a replacement of the entire track belt.

In the construction of a further rubber belt track or Caterpillar for vehicles, such as is disclosed in German Laid-Open Patent Application 26 21 237, a connection for the track ends is provided in the form of a hinge. The hinge members possess mutually offset tubular sections which are pivotally interconnectable through a pin or bolt, and transversely extending traction or tie anchors for fastening of the steel cables. The tie anchors are connected to the tubular sections through the use of shackles. The relatively heavy weight of the rubber belt track or Caterpillar results from the meandering arrangement of the cables, wherein the cables are alternatingly slung about rods and tube members which are similarly integrated in the belt track structure. Another disadvantage encountered is that partial damage to the rubber Caterpillar or belt track can only be eliminated by replacing the complete rubber belt track.

SUMMARY OF THE INVENTION

Accordingly, it is an object of the present invention to provide a belt track or Caterpillar chain with replaceable or exchangeable belt segments which are resistant to tensile forces or stresses, particularly in the direction of travel, while being of a relatively low weight.

The invention attains the foregoing object in that the inserts consist of at least two endless fabric bands or webs arranged at a spacing adjacent each other, the arms terminating proximate a nonelastic bending region of a rubber or track dog, or transversely stiff traverse, and in which the hinge members possess laterally arranged arms.

Pursuant to the foregoing, there is provided a belt segment which is of a high tensile strength, having a low weight and adequate lateral stiffness or strength in view of this presence of the endless high-strength fabric bands or webs which are integrated in the rubber and which encompass the tie anchors of the hinge members. The fabric bands or webs form the supporting members which transmit a high tensile force with only a low degree of stretching. The encompassing by the bands of the pin which is in the shape of a lateral traverse lines within the static; in essence, still region of the band or web segment.

According to another feature, located between the pin and the traverse is an extremely short ending region possessing a high moment of resistance. As a consequence thereof, the load acting on the fabric bands or webs in this critical region is very low. Consequently, the fabric band is not subjected to wear in the encompassing region of the tie anchor during relative movements.

Specific pivoting zones for the hinge member are defined by their possessing lateral arms and a central arm. Therefore, the surfaces which are subjected to particularly high loads or stresses can be designed to be specifically resistant to wear.

In accordance with another aspect, the belt track or caterpillar is imparted a good transverse stiffness through the presence of the plate or shackle members arranged at the sides of the hinge member.

An expedient configuration of the hinge members pursuant to the invention is obtained with regard to relatively wide Caterpillars or belt tracks.

An unhindered undampened rotatability of the hinge members is ensured by the inventive structure. Moreover, in contrast with German Laid-Open Patent Application 26 21 237, there is present a good lateral guidance for the hinge members within the hinging region. In the aforementioned German OS No. 26 21 237, the construction contemplates the provision of rubber bush on the track pin at the sides of the metal hinge members. The rubber bushings allow for a certain degree of lateral displacement. This lateral displacement can lead to an increased amount of wear on the pins due to the tilting of the eyes of the metal hinges relative to the axis of the connecting pin, and thereby to the premature failure of the rubber bushings. According to the present invention, the hinge eyes are embedded over one-half in rubber in the region of the rubber dogs, whereby the arms are completely embedded in rubber, so that the hinge linkage is stiffly supported in rubber within the belt segment. In comparison therewith, a high degree of elasticity is evident between two rubber dogs at right angles to the direction of travel of the belt track. The stiff portion of the belt segment protects the fabric bands or webs in the region in which they encompass the tie anchors.

Another provides for clamping of the fabric bands or webs to the hinge members through the application of a tensile load or stress which is provided during the course of manufacture, by means of stretching or tensioning of the fabric bands, with subsequent fixing of the stretched fabric bands by vulcanization with the base member. During the traveling operation of the track or caterpillar, the region of the fabric bands encompassing the pin thereby is relieved of critical stress peaks.

Pursuant to a further feature, the invention provides for a rapid and inexpensive replaceability or exchangeability of damaged belt segments.

An inexpensive manufacture is also present for a hinge member, which also incorporates the pin to be encompassed by the fabric bands. A suitable method of manufacture involves the use of forging, casting or metal-reinforced plastic materials.

With regard to another aspect, it is advantageous that the pin of the hinge member can consist of a different material then that of the hinge member. For example, the pin may be constituted from plastic material, or produced from a metal tube, while the hinge member consists of a steel casting.

BRIEF DESCRIPTION OF THE DRAWINGS

Reference may now be had to the following detailed description of embodiments of the invention, taken in conjunction with the accompanying drawings; in which.

DETAILED DESCRIPTION

Figure 1:
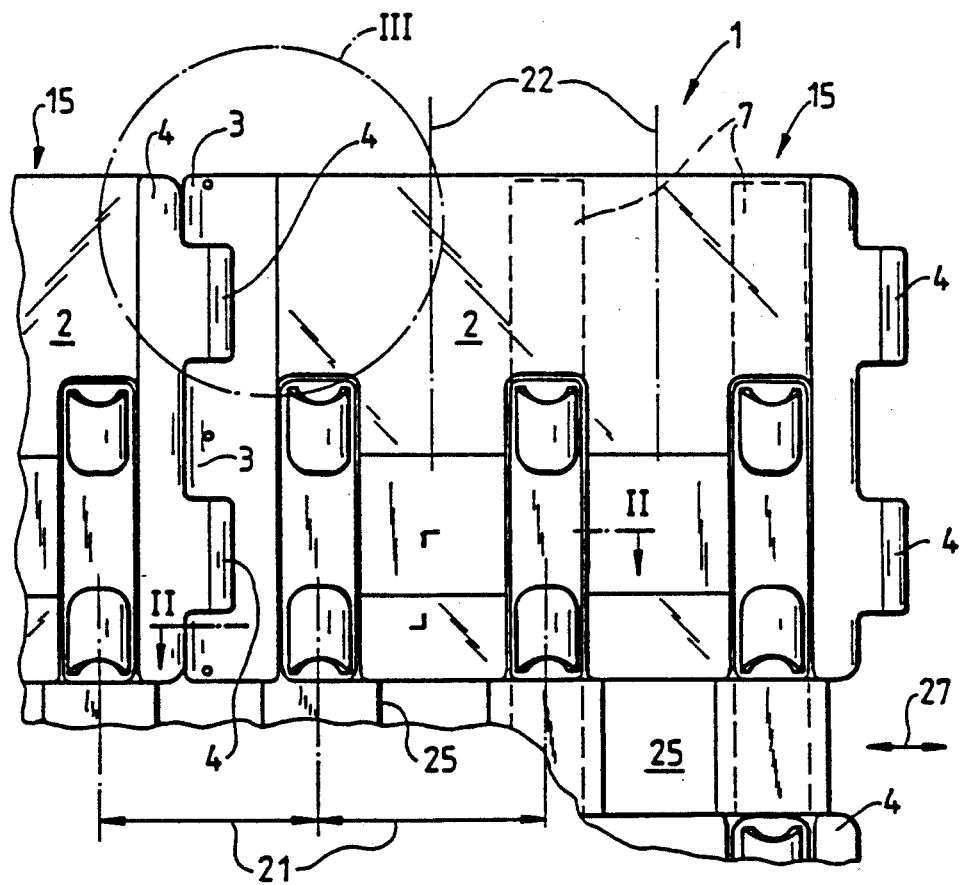
FIG. 1 illustrates, in plan view, a portion of a caterpillar or belt track.

A belt track or Caterpillar includes belt segments 15. Each belt segment 15 includes a base member 2 consisting of rubber. Vulcanized into the main body 2 arc hinge members 3, 4; high-strength fabric bands or webs 5 consisting of endless woven bands, pins 6 each forming a tie anchor; and plate or bar members 7 which extend over almost the entire width of the track.

The hinge members 3, 4 are equipped with side and central arms 8, 9. Furthermore, the hinge members 3, 4 also include tubular segments 10 and 11. A track pin or bolt 12 is fixed in the hinge member 3 by pin members 13.

The length 20 of the arms 8, 9 corresponds to approximately one-third of the pitch 21 of the track, A spacing 14 is provided between the pin 6 and the bar member 7. The elastic region of the base member is located in the plane 22 between two rubber dogs 23.

Guide teeth 32 which are arranged on plates 31 are .connected by means of screw connections 30 with the plate or bar members 7 which are disposed on the side facing the roadway. The rubber dogs 23 which face towards the roadway are provided with bores 24.

Cutouts 25 are provided in the main body on the side facing towards the track wheels, for engagement with the teeth of drive wheels (not shown). The direction of travel of the track or Caterpillar is identified by reference numeral 27.

The fabric bands or webs 5, which may be of a two-ply material, are capable of transmitting a high tensile force at only a low degree of stretching or expansion. Due to the engagement of the drive wheels in the cutouts 25, the flow of force is initially transmitted to the entire cross-section of the belt track 1, and thereafter distributed over the entire length of the belt track 1 by means of the fabric bands 5 and the hinge members 3, 4.

The bending region which is critical to the fabric bands 5 pursuant to the spacing 14, which is occasioned by the drive wheels and by the track rollers, is extremely short. The large moment of resistance in the mentioned bending region will ensure a lengthy service life for the fabric bands 5.

Figure 4:
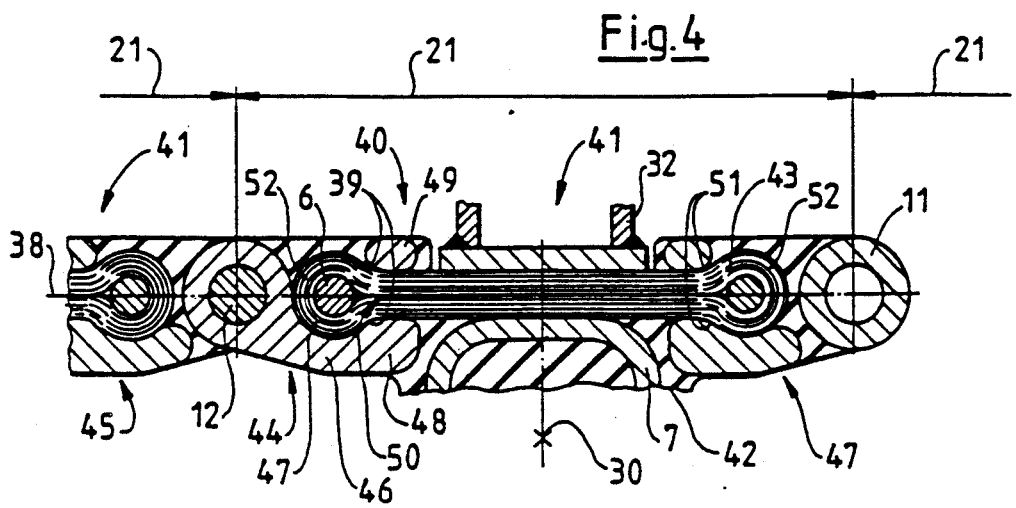
FIG. 4 illustrates a longitudinal sectional view of another embodiment of a belt track.

As shown in FIG. 4, a belt track or caterpillar 40 consists of track or belt segments 41, in conformance with the track pitch 21. Each segment 41 has a base member 42 consisting of rubber, two hinge members 44 and 45, and a plurality of fabric bands or webs 43.

Figure 2:
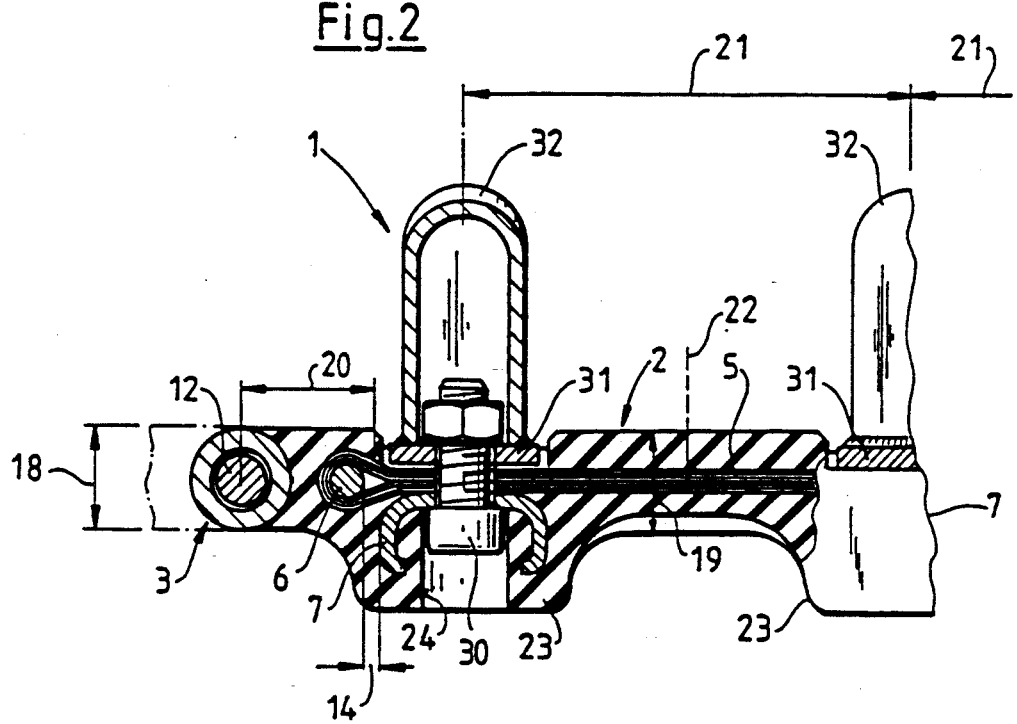
FIG. 2 illustrates a sectional view taken along line II—II of the track of FIG. 1.
Figure 3:
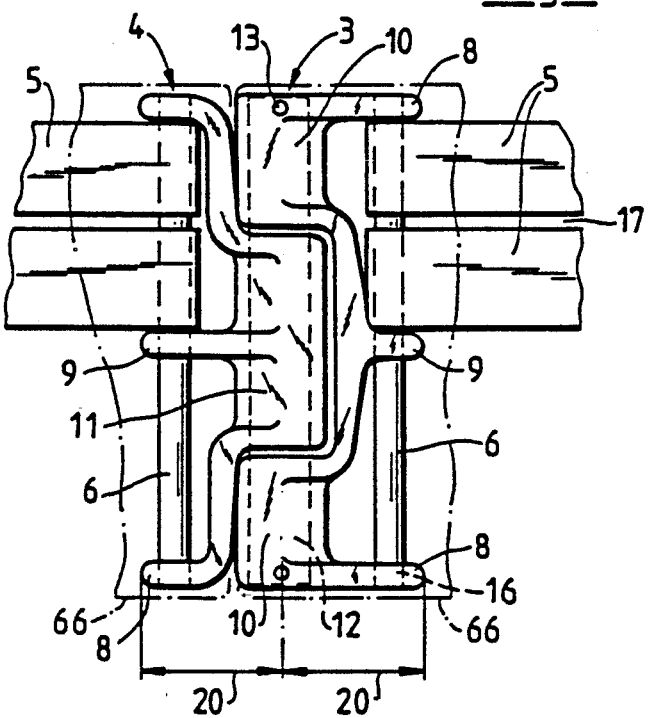
FIG. 3 illustrates the encircled portion II in FIG. 1.

In contrast with the track 1 illustrated in FIGS. 1 through 3, in this embodiment the hinge members 44, 45 are equipped with a self-clamping retainer for the endless fabric bands 43. Each hinge member 44, 45 possesses arms 46 with a recess 47 in the height of the tie anchor 6, a lower support member 48 and an upper support member 49 at a spacing of twice the thickness of the fabric band 43. A slot 50 which is formed as a result of the foregoing is located in the plane 38 of the pins 6, 12. The upper support member 49 is connected to the hinge member 44, 45 by means of the arms 46, in a manner which is not illustrated in the drawing. Rounded surfaces 39 are provided on the support members 48, 49. Prior to the vulcanization of the base member 42, the fabric band 43 which encircles the pins or tie anchors 6 is stretched within the elastic range on the track pitch 21. Only thereafter is there carried out the operation of vulcanizing the base member 42. Due to the stretching action, the thickness of the fabric band 43 also reduces somewhat within the slot 50. During the vulcanization operation, rubber also penetrates into the gaps 51, and fixes the fabric band 43 in place within the slot 50. The fabric bands are therefore fixed under a prestressing action in the region 52 in which they encompass the tie anchors 6, so that during the traveling operation of the belt track 40, the fabric bands 43 are relieved of any load or stresses and possess a long service life.

Figure 5:
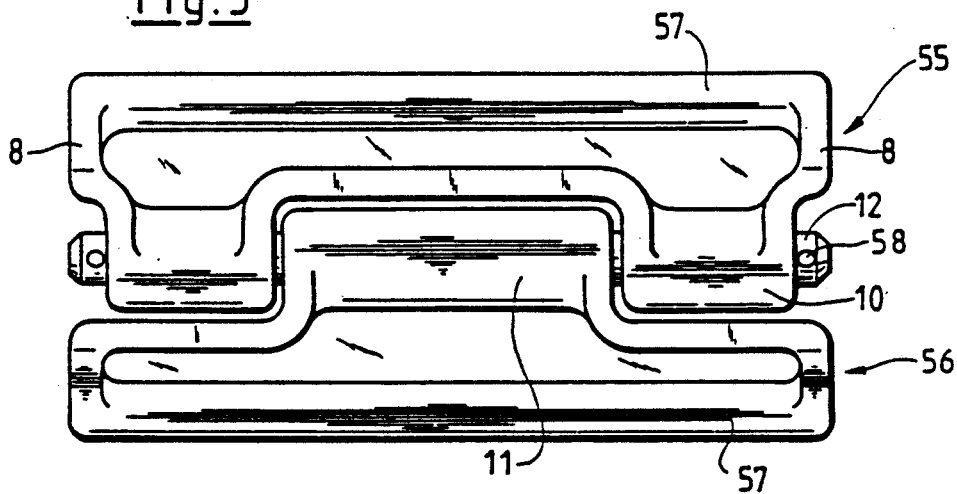
FIGS. 5 and 6, respectively, illustrate different hinge members of a belt track.

In the arrangement shown in FIG. 5, there are present cast hinge members 55, 56 with pin or bolt portions 57 cast therewith. The track pin 12 includes bores 58 for cotter pins (not shown).

Figure 6:
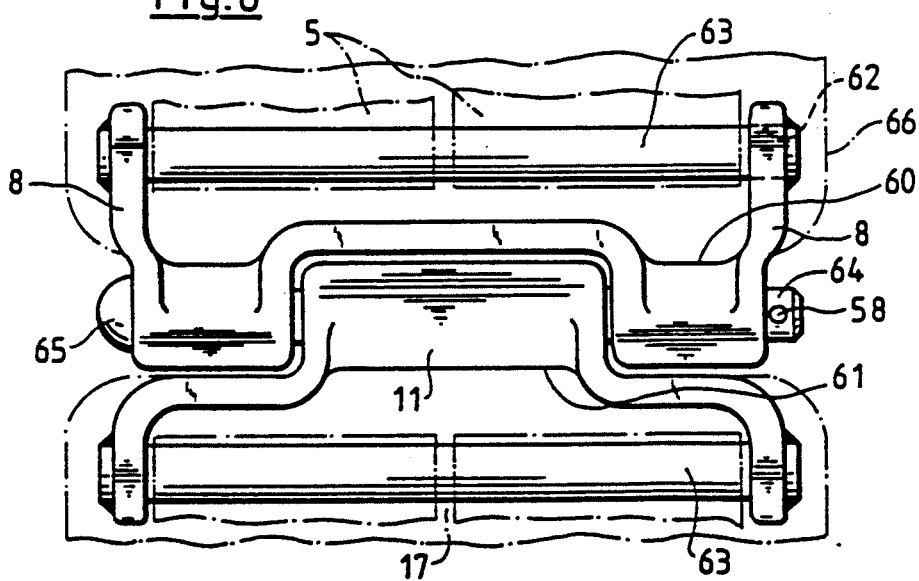

FIG. 6 similarly discloses cast hinge members 60, 61, however, with pin elements 63 which are welded into position in bores 62 being ascertainable. A track pin 64 is provided with a head 65 and the bore 58 which is intended to receive a cotter pin (not show).

The fabric bands or webs 5 and the external contour of the base member 66 which consists of rubber are shown in phantom lines.

What is claimed is:

1. A belt track for track-laying vehicles and snowmobiles, comprising a plurality of individual replaceable track belt segments, connecting locations between each of said track belt segments, each said track belt segment including a base member consisting of rubber, tensileloadable fabric band inserts being vulcanized into the rubber, a pin-shaped tie anchor which is encompassed by said fabric inserts in the region of the connecting locations for the track belt segments, said tie anchor being transversely supported within the rubber base member, said connecting locations including hinge members which are vulcanized into the rubber track belt segments, said hinge members each including tubular sections for the insertion of tubes or track pins therein; externally extending arms arranged at lateral spacings from each other and extending from the sides of tubular hinge member sections for supporting said tie anchor therein, said arms terminating proximate a nonelastic bending region of a track dog or a transversely stiff traverse, said arms supporting said fabric insert therebetween each other and the diameter of the tubular hinge sections and height of the hinge members being generally in conformance with the thickness of said base member.

2. A belt track as claimed in claim 1, wherein said tie anchor is secured against rotation in only one of the two hinge members.

3. A belt track as claimed in claim 1, wherein said hinge members each have said arms extending from the sides of the tubular members proximate the ends thereof and a further arm extending from the sides of the tubular members proximate the center thereof.

4. A belt track as claimed in claim 1, wherein a slot for a two-ply fabric band insert is formed on a portion of hinge members facing the fabric insert bands in the plane of the track pin and the connecting pin, facing lower and upper support members of said hinge members having rounded surfaces forming said slot, and that in the encircling region of the fabric insert bands with the connecting tie anchor said fabric insert bands are fixed to the slot in a prestressed condition through the vulcanization of rubber in gaps present therebetween.

5. A belt track as claimed in claim 4, wherein said hinge members form a belt segment having the spacing of the track pitch.

6. A belt track as claimed in claim 1, wherein each said tie anchor pin is integrally connected with the hinge member.

7. A belt track as claimed in claim 1, wherein each said tie anchor pin is welded to the arms of each of the hinge members.

* * * * *